US012573104B2

(12) United States Patent
Ono

(10) Patent No.: US 12,573,104 B2
(45) Date of Patent: Mar. 10, 2026

(54) STORAGE MEDIUM STORING GRAPH DRAWING PROGRAM AND SERVER

(71) Applicant: CASIO COMPUTER CO., LTD., Tokyo (JP)

(72) Inventor: Manato Ono, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 147 days.

(21) Appl. No.: 18/640,774

(22) Filed: Apr. 19, 2024

(65) Prior Publication Data

US 2024/0265596 A1     Aug. 8, 2024

Related U.S. Application Data

(63) Continuation of application No. PCT/JP2022/042895, filed on Nov. 18, 2022.

(30) Foreign Application Priority Data

Dec. 16, 2021     (JP) ................................. 2021-204394

(51) Int. Cl.
| | |
|---|---|
| *G06F 3/04883* | (2022.01) |
| *G06T 11/20* | (2006.01) |
| *G09B 7/02* | (2006.01) |

(52) U.S. Cl.
CPC ........ *G06T 11/206* (2013.01); *G06F 3/04883* (2013.01); *G09B 7/02* (2013.01)

(58) Field of Classification Search
None
See application file for complete search history.

(56) References Cited

U.S. PATENT DOCUMENTS

| | | | | |
|---|---|---|---|---|
| 10,402,085 B2 * | 9/2019 | Tsukahara | .............. | G06V 30/36 |
| 2009/0324107 A1 * | 12/2009 | Walch | .............. | G06V 30/18181 |
| | | | | 382/224 |

(Continued)

FOREIGN PATENT DOCUMENTS

| | | |
|---|---|---|
| JP | H10124690 A | 5/1998 |
| JP | H11184819 A | 7/1999 |

(Continued)

OTHER PUBLICATIONS

International Search Report dated Jan. 31, 2023 issued in PCT/JP2022/042895.

(Continued)

*Primary Examiner* — Yu Chen
(74) *Attorney, Agent, or Firm* — Scully, Scott, Murphy & Presser, P.C.

(57) ABSTRACT

A non-transitory storage medium stores a graph drawing program for causing a computer to execute acquiring a plot point of a first graph by a handwriting input, regressively calculating a plurality of graph data by a plurality of regression models, based the acquired plot point, performing first determination to determine, in regard to each of the graph data, whether at least a partial data element is included in a predetermined range of coordinates, performing second determination to determine graph data having a good regression accuracy among the plurality of graph data, selecting one of the graph data, based on a result of the first determination and a result of the second determination and drawing a second graph in place of the first graph, based on the selected graph data.

8 Claims, 8 Drawing Sheets

(56) References Cited

U.S. PATENT DOCUMENTS

| | | | | |
|---|---|---|---|---|
| 2010/0290706 A1* | 11/2010 | Wang | ............... | G06F 3/04886 |
| | | | | 382/188 |
| 2011/0244434 A1* | 10/2011 | Livne | ............... | G09B 19/025 |
| | | | | 434/188 |
| 2015/0310646 A1* | 10/2015 | Karoji | ............... | G06T 11/206 |
| | | | | 345/440 |
| 2018/0293908 A1* | 10/2018 | Wang | ............... | G06F 18/214 |
| 2018/0374248 A1* | 12/2018 | Okuma | ............... | G06T 11/206 |
| 2019/0096366 A1* | 3/2019 | Akae | ............... | G06F 3/1454 |
| 2020/0082153 A1* | 3/2020 | Holden | ............... | G06V 40/388 |
| 2021/0232235 A1* | 7/2021 | Regani | ............... | G06F 3/0346 |
| 2022/0121884 A1* | 4/2022 | Zadeh | ............... | G06N 3/006 |

FOREIGN PATENT DOCUMENTS

| | | | |
|---|---|---|---|
| JP | 2000181903 A | 6/2000 | |
| JP | 2011158945 A | 8/2011 | |
| JP | 2016103147 A | 6/2016 | |

OTHER PUBLICATIONS

International Preliminary Report on Patentability and Written Opinion dated Jun. 27, 2024 received in International Application No. PCT/JP2022/042895.

\* cited by examiner

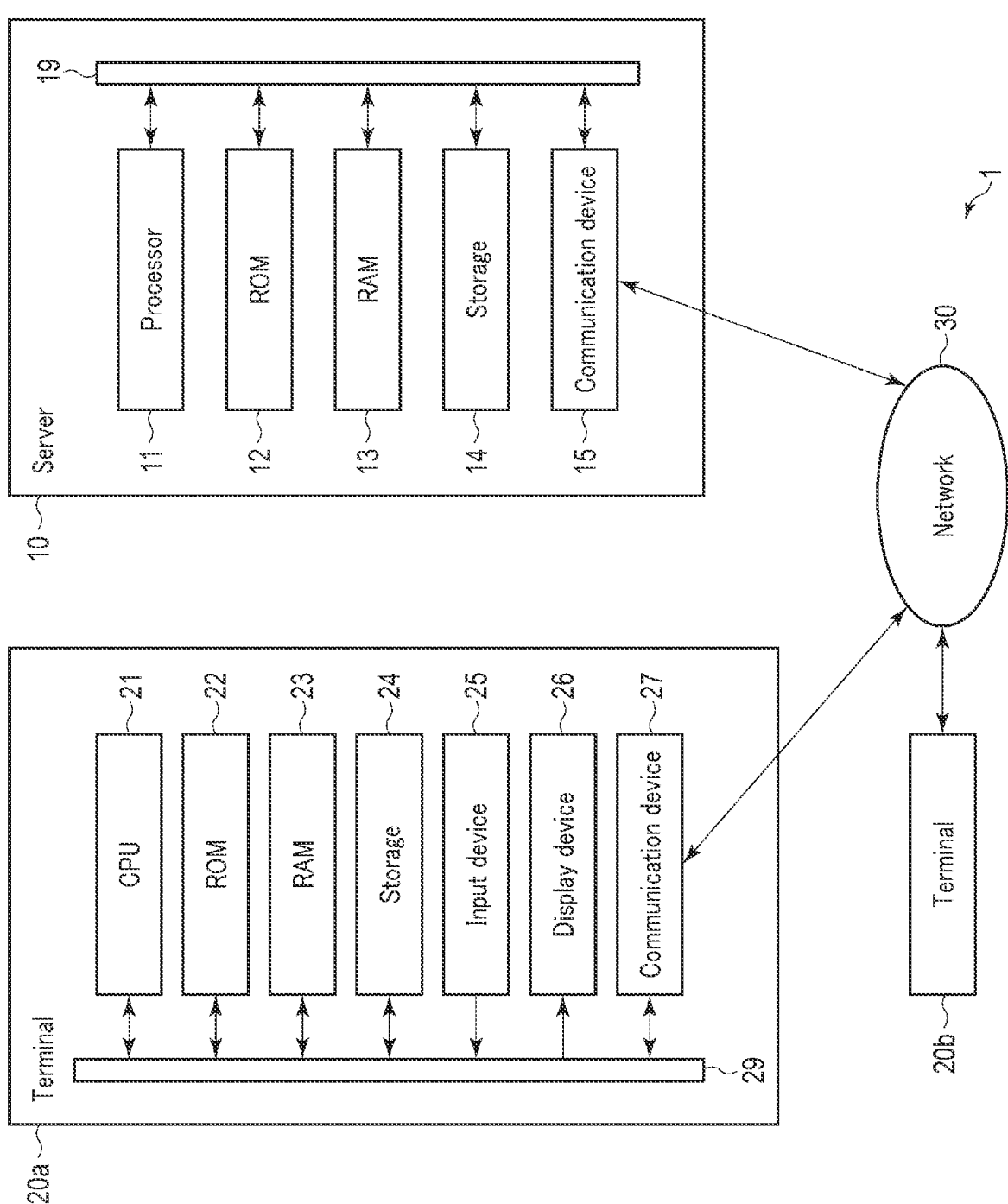
F I G. 1

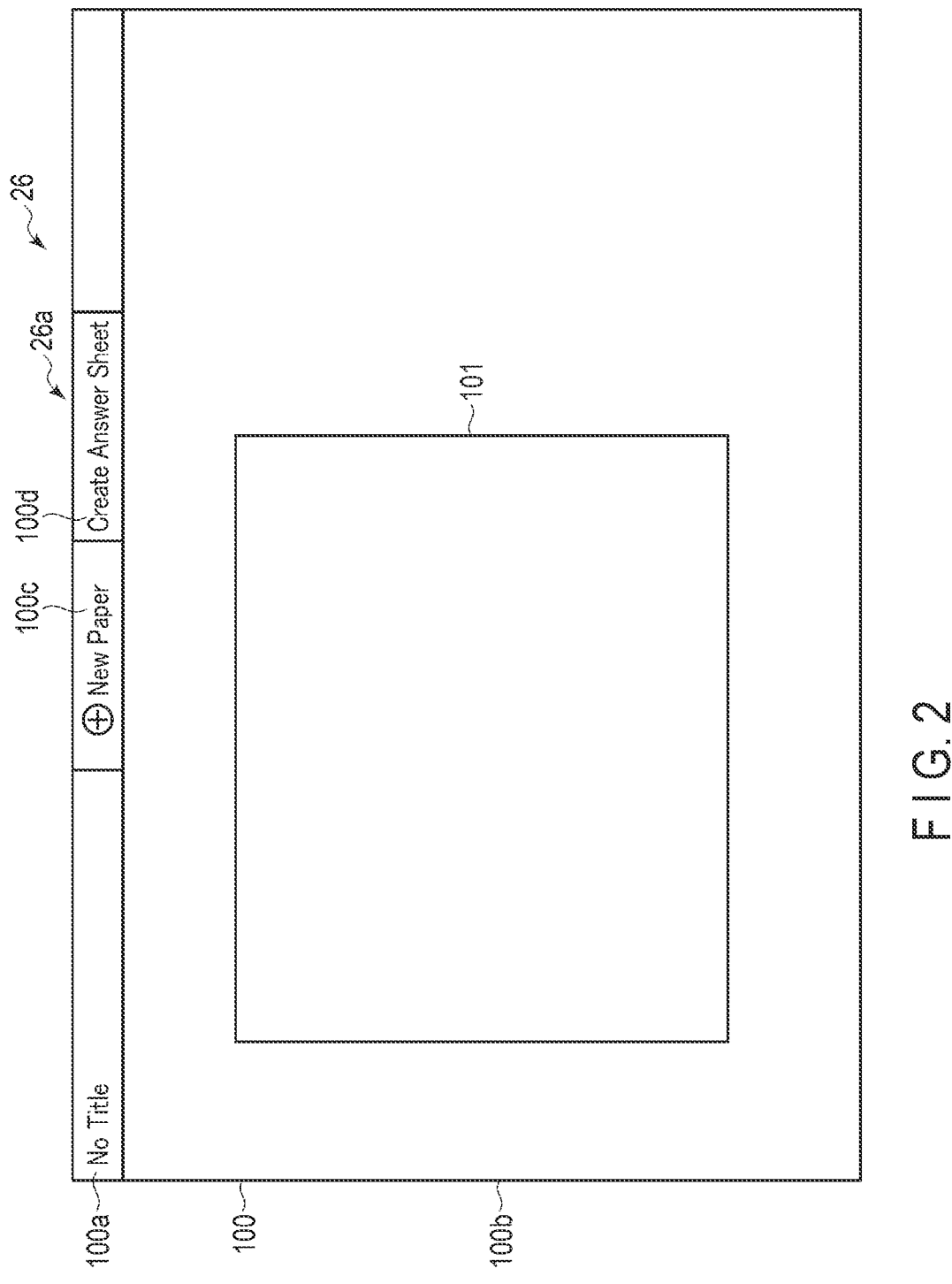
F I G. 2

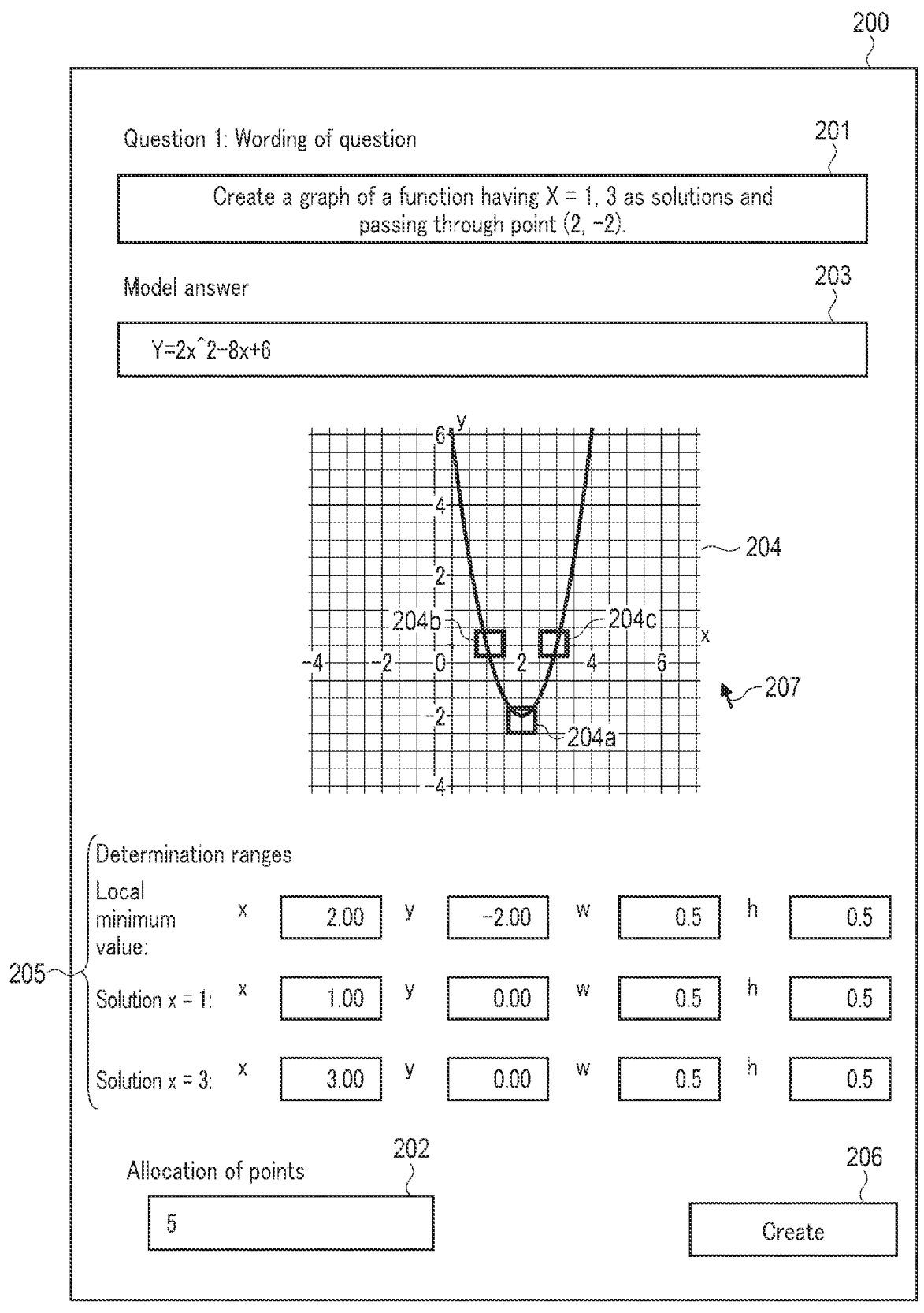
F I G. 4

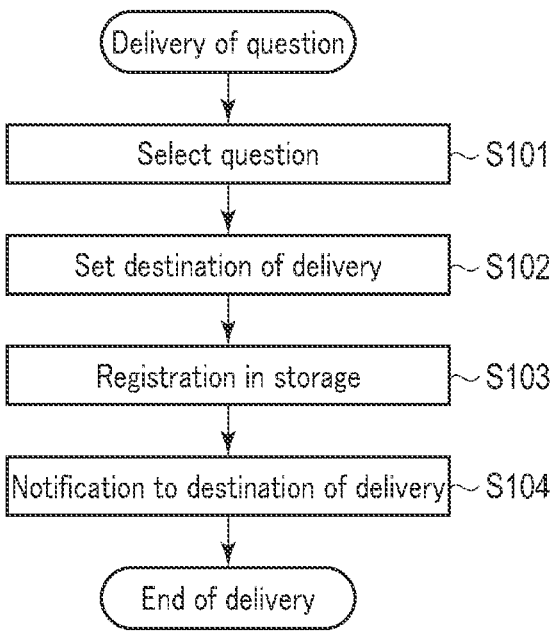
F I G. 5

STORAGE MEDIUM STORING GRAPH DRAWING PROGRAM AND SERVER

CROSS-REFERENCE TO RELATED APPLICATIONS

This application is a Continuation Application of PCT Application No. PCT/JP2022/042895, filed Nov. 18, 2022 and based upon and claiming the benefit of priority from the prior Japanese Patent Application No. 2021-204394, filed Dec. 16, 2021, the entire contents of both of which are incorporated herein by reference.

FIELD

The present disclosure relates to a storage medium storing a graph drawing program and a server.

BACKGROUND

In recent years, online classes have begun to be introduced. In such online classes, tests or the like are also conducted online. There has been proposed a system that can perform automatic marking in regard to tests or the like conducted online. In the meantime, in a test or the like of mathematics, there is a case where a question of drawing a graph is prepared. However, it is difficult for a test taker, such as a student, to exactly draw a graph on a computer by handwriting. On the other hand, if a graph is automatically drawn based on an input graph formula, a marker, such as a teacher, is unable to understand whether the test taker draws the graph by actually understanding the graph. Thus, there is a demand for a technology for supporting drawing of a graph on a computer by handwriting.

SUMMARY

According a first aspect of the invention, there is provided a computer-readable non-transitory storage medium storing a graph drawing program for causing a computer to execute: acquiring a plot point of a first graph by a handwriting input; regressively calculating a plurality of graph data by a plurality of regression models, based the acquired plot point; performing first determination to determine, in regard to each of the graph data, whether at least a partial data element is included in a predetermined range of coordinates; performing second determination to determine graph data having a good regression accuracy among the plurality of graph data; selecting one of the graph data, based on a result of the first determination and a result of the second determination; and drawing a second graph in place of the first graph, based on the selected graph data.

According a second aspect of the invention, there is provided a server comprising a processor including hardware configured to: acquire a plot point of a first graph by a handwriting input; regressively calculate a plurality of graph data by a plurality of regression models, based the acquired plot point; perform first determination to determine, in regard to each of the graph data, whether at least a partial data element is included in a predetermined range of coordinates; perform second determination to determine graph data having a good regression accuracy among the plurality of graph data; select one of the graph data, based on a result of the first determination and a result of the second determination; and draw a second graph in place of the first graph, based on the selected graph data.

BRIEF DESCRIPTION OF THE DRAWINGS

FIG. 1 is a diagram illustrating an example of a configuration of a system according to an embodiment.

FIG. 2 is a view illustrating an example of screen display by an application operating on a Web browser of a terminal 20a.

FIG. 3 is a flowchart illustrating an example of an operation of the system at a time of creating paper for an answer for a test or the like.

FIG. 4 is a view illustrating a question creating screen.

FIG. 5 is a flowchart illustrating an operation of the system at a time of delivering a created question.

DETAILED DESCRIPTION

Figure 3:
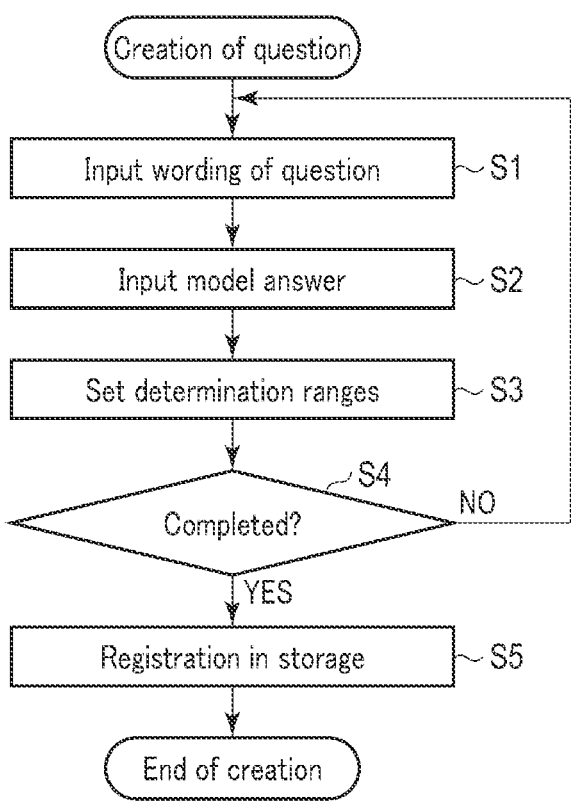

An embodiment is described with reference to the accompanying drawings. FIG. 1 is a diagram illustrating an example of a configuration of a system 1 according to the embodiment. The system 1 includes a server 10, and terminals 20a and 20b. The server 10 and the terminals 20a and 20b are communicably connected via a network 30. The network 30 is, for example, the internet. The number of terminals is not limited to two.

The server 10 includes a processor 11, a ROM 12, a RAM 13, a storage 14, and a communication device 15. These are interconnected via a system bus 19.

The processor 11 may be an integrated circuit including a CPU (Central Processing Unit) or the like. The ROM 12 records information used for the operation of the processor 11 or the like. The RAM 13 is a main storage device for the operation of the processor 11 or the like. The storage 14 stores various programs such as a server control program used in the processor 11 and an arithmetic program for executing various arithmetic operations, parameters, and the like. The server control program includes a graph drawing program. The processor 11 controls the operation of the server 10 in accordance with a program stored in the storage 14. In accordance with a drawing program stored in the storage 14, the processor 11 can operate, for example, as an acquisition unit, a calculation unit, a first determination unit, a second determination unit, a selection unit, and a drawing unit. Use may be made of a processor other than the CPU, for example, an ASIC (Application Specific Integrated Circuit), an FPGA (Field Programmable Gate Array), a GPU (Graphic Processing unit), or the like. The communication device 15 includes a circuit for communicating with an external communication network such as the network 30.

The terminal 20a, 20b may be an electronic device such as a personal computer (PC), a tablet terminal, or a smartphone. Besides, the terminal 20a, 20b may be a scientific calculator or the like including a communication function. The terminal 20a is a terminal that is operated by a marker of a test, such as a teacher. The terminal 20b is a terminal that is operated by a test taker of a test, such as a student. Hereinafter, assuming that the terminal 20a and terminal 20b have the same configuration, the configuration of the terminal 20a is described. In addition, in the description below, where necessary, the marker and the test taker are distinguished as a first user and a second user, respectively.

The terminal 20a includes a CPU 21, a ROM 22, a RAM 23, a storage 24, an input device 25, a display device 26, and a communication device 27. These are interconnected via a system bus 29. Note that the terminal 20a and terminal 20b may not necessarily have the same configuration.

The CPU 21 is a processor that controls various operations of the terminal 20a. The ROM 22 records a start program or the like of the terminal 20a. The RAM 23 is a main storage device for the CPU 21 or the like. The storage 24 stores various programs such as a terminal control program used by the CPU 21, parameters, and the like. The CPU 21 controls the operation of the terminal 20a by executing various programs in accordance with an input signal from the input device 25, and a reception signal by the communication device 27. The various programs may be downloaded to the storage 24 from a Web server (not illustrated) via the network 30 and the communication device 27. The communication device 27 includes a circuit for communicating with an external communication network such as the network 30.

The input device 25 includes a keyboard, a mouse, a touch panel, and the like. In accordance with an operation of a user through the input device 25, a signal indicating the content of the user's operation is input to the CPU 21 via the system bus 29.

The display device 26 is a liquid crystal display, an organic EL display, or the like. The display device 26 may be integrally provided in the terminal 20a, or may be separately provided from the terminal 20a. Various images are displayed on the display device 26.

In one example, the first user designates an address of the server 10 on the Web browser operating on the terminal 20a. At this time, a display screen for a Web application stored in the server 10 is displayed on the Web browser on the terminal 20a. A request to the sever 10 is issued in response to an operation through the input device 25 on this display screen. This operation includes such an operation as creation of a question of a test. The server 10 executes a process corresponding to the request, and returns a processing result to the terminal 20a as a response. In accordance with the response from the server 10, the terminal 20a executes display or the like corresponding to the user's operation. Similarly, the second user designates the address of the server 10 on the Web browser operating on the terminal 20b. At this time, a display screen for the Web application stored in the server 10 is displayed on the Web browser on the terminal 20b. A request to the sever 10 is issued in response to an operation through the input device 25 on this display screen. This operation includes such an operation as answering to a test. The server 10 executes a process corresponding to the request, and returns a processing result to the terminal 20b as a response. In accordance with the response from the server 10, the terminal 20b executes display or the like corresponding to the user's operation. In this manner, in the system 1, a function as a Web application for a test or the like is implemented by the program operating on the Web browser of the terminal 20a, 20b and the arithmetic program of the server 10.

Such a Web application can be utilized in a class of mathematics or the like, for example, in the scene of school education in which ICT (Information and Communication Technology) is progressing.

FIG. 2 is a view illustrating an example of screen display by an application operating on a Web browser of the terminal 20a.

A screen 26a displayed on the display device 26 of the terminal 20a includes an upper area 100a and a lower area 100b. The upper area 100a is displayed on the upper side of the screen 26a. The upper area 100a is an elongated area, compared to the lower area 100b. The upper area 100a displays a new paper creation icon 100c. In addition, the upper area 100a displays an answer sheet creation button 100d. The lower area 100b is an area displayed on the lower side of the upper area 100a in the screen 26a. In the description below, the lower area 100b is also referred to as "paper 100". Various "sticky notes" 101 can be displayed on the paper 100. The sticky note 101 is a display area for displaying various information relating to the Web application. For example, the sticky notes 101 include a mathematical expression sticky note for creating a mathematical expression, a graph sticky note for creating a graph, a table sticky note for creating a table, a figure sticky note for creating a figure, and a comment sticky note for creating a comment. The sticky note 101 may be a floating object. The floating object is an object (display object) displayed on the screen, and is an object, at least the display position of which can be changed in accordance with a user operation.

In the present embodiment, the system 1 can start with the paper 100 that is a blank paper, and can create various sticky notes. Note that, also in the terminal 20b, the same paper 100 as in the terminal 20a can be displayed. However, on the paper 100 of the terminal 20b, the answer sheet creation button 100d may not be displayed.

Hereinafter, a flow of serial processes in the system 1 is described. FIG. 3 is a flowchart illustrating an example of the operation of the system 1 at a time of creating paper for an answer for a test or the like. Hereinafter, a description is given of an example of creation of paper for answering a question relating to drawing of a graph of mathematics or the like.

A process of FIG. 3 is started in a case where the answer sheet creation button 100d is selected on the screen of the Web application that is being active on the terminal 20a. Note that in a case of activating the Web application, a login process, such as an input of an ID and a password, may be executed. The process of FIG. 3 is executed by the cooperation between the CPU 21 of the terminal 20a and the processor 11 of the server 10. The first user such as a teacher that is in a position of creating paper for an answer creates the paper for answering on a question creation screen 200 illustrated in FIG. 4. The question creation screen 200 may be displayed in the sticky note 101, or may be displayed separately from the sticky note 101. As illustrated in FIG. 4, the question creation screen 200 includes a wording-of-question input field 201, an allocation-of-points input field 202, a model answer input field 203, a graph drawing area 204, a determination range input field 205, and a creation button 206. The wording-of-question input field 201 is an input field for inputting a wording of a question for a test. The allocation-of-points input field 202 is an input field for inputting a value of an allocation of points to a corresponding question. The model answer input field 203 is an input field for inputting a graph expression of a model answer to a corresponding question. The graph drawing area 204 is an area for drawing a graph corresponding to the graph expression of the input model answer. The determination range input field 205 is an input field for inputting a determination range. The creation button 206 is a button that is selected at a time of completing the creation of the question. The user can select each input field or the like by moving a cursor 207 on the question creation screen 200 displayed on the Web browser, or by directly touching each input field.

In step S1, the first user inputs a wording of a question in the wording-of-question input field 201 of the question creation screen 200. In addition, the first user inputs the allocation of points of the input question to the allocationof-points input field 202 of the question creation screen 200. The content input by the first user is transferred to the server 10. The processor 11 of the server 10 updates the display of the wording-of-question input field 201 in accordance with the input content, and returns the updated screen to the terminal 20*a*.

In step S2, the first user inputs a graph expression of a model answer to the wording of the question, which is input to the wording-of-question input field 201, to the model answer input field 203 of the question creation screen 200. The content input by the first user is transferred to the server 10. The processor 11 updates the display of the model answer input field 203 in accordance with the input content. In addition, based on the input graph expression, the processor 11 draws a graph corresponding to the model answer on the graph drawing area 204. FIG. 4 illustrates an example in which $y=2x^2-8x+6$, that is, the graph expression of the model answer, is drawn.

Further, the processor 11 extracts feature points in the input graph expression of the model answer. The feature points are determined on a graph-expression-by-graph-expression basis. For example, in a case where a graph expression is a linear function, a feature point is an intersection with an x axis. The feature point may also include an intersection or the like with a y axis. In addition, for example, in a case where a graph expression is a higher-order function such as a quadratic function or a cubic function, feature points are an intersection with an x axis, a local minimum point, a local maximum point, and an inflection point. The feature points may also include an intersection with the y axis. Besides, for example, in a case where a graph expression is a logarithmic function, feature points are an intersection with the x axis, an infinite point, i.e., a point at an end of the graph drawing area 204, and the like. In the example, intersections with the x axis, $(x, y)=(1, 0)$, $(3, 0)$, and a local minimum point $(x, y)=(2, -2)$ in $y=2x^2-8x+6$, which is the graph expression of the model answer, are extracted.

After extracting such feature points, the processor 11 sets a determination range that is preset for each feature point. The determination range is a range for determining whether an input graph in a graph input process (to be described later) represents a graph indicated by the graph expression of the model answer. If the feature points of the input graph are within the determination ranges, the input graph is determined to represent the graph indicated by the graph expression of the model answer. The details will be described later. The determination range includes coordinates (x, y) of a center point, a width w and a height h. The coordinates of the center point are the coordinates of the center point of the determination range. For example, the initial values of the coordinates of the center point of the determination range are the coordinates of the feature point. The width w is a range in the x-axis direction of the determination range. For example, a range of $\pm\frac{1}{2}w$ with a reference point being set at the center point is set as the range in the x-axis direction of the determination range. The height h is a range in the y-axis direction of the determination range. For example, a range of $\pm\frac{1}{2}h$ with a reference point being set at the center point is set as the range in the y-axis direction of the determination range. For example, the initial values of the width w and height h are 0.5.

After the setting of the determination ranges, the processor 11 displays the determination ranges set for the respective feature points in the determination range input field 205. In addition, the processor 11 also displays the set determination ranges in the graph drawing area 204. A determination range 204*a* in FIG. 4 is a determination range set for the local minimum point. A determination range 204*b* in FIG. 4 is a determination range set for the intersection (1, 0) with the x axis. A determination range 204*c* in FIG. 4 is a determination range set for the intersection (3, 0) with the x axis. Thereafter, the processor 11 returns the updated screen to the terminal 20*a*.

Here, the description returns to FIG. 3. In step S3, the first user sets once again, where necessary, the determination ranges displayed in the determination range input field 205. For example, the first user inputs desired numerical values to input fields of x, y, w and h of the determination range input field 205. In addition, for example, the first user enlarges or reduces the determination range 204*a*, 204*b*, 204*c* displayed on the graph drawing area 204, for example, by a drag operation. The content input by the first user is transferred to the server 10. The processor 11 updates the determination range in accordance with the input content. In addition, the processor 11 updates the display of the determination range input field 205, and returns the updated screen to the terminal 20*a*. Here, it is desirable that limitations be provided on the values of x, y, w and h that can be set by the first user. Such limitations can be provided in order to improve the accuracy of determination in determining whether the input graph represents the graph indicated by the graph expression of the model answer. In addition, such a configuration may be adopted that a determination range can be set for a freely selected point other than the feature points illustrated in FIG. 4. For example, upon the first user designating a point on the graph displayed on the graph drawing area 204, the processor 11 displays the coordinates of the designated point. The first user may designate the width w and height h in regard to the displayed coordinates of the point.

In step S4, the processor 11 determines whether the creation of the question is completed. For example, the first user confirms the content of the question created by the first user himself/herself. In addition, upon confirming the completion of creation of the question, the first user selects the creation button 206. If the creation button 206 is selected, it is determined that the creation of the question is completed. In step S4, if it is not determined that the creation of the question is completed, the process returns to step S1. In step S4, if it is determined that the creation of the question is completed, the process advances to step S5.

In step S5, the processor 11 creates the paper 100 for answering from the data of the created question, and registers the data of the created paper 100 for answering in the storage 14. As will be described later, the paper 100 for answering is data including a display field of the wording of a question and an input field of an answer. Here, the paper 100 for answering may be created from data of a plurality of questions. In addition, a unique URL is correlated with the paper 100 for answering. After registering the data of the paper 100 for answering in the storage 14, the processor 11 terminates the process of FIG. 3.

FIG. 5 is a flowchart illustrating an operation of the system 1 at a time of delivering a created question. A process of FIG. 5 is started in accordance with a delivery request from the terminal 20*a*. The delivery request can be made, for example, by the first user's operation of the terminal 20*a*, for example, while the Web application is being active.

In step S101, the first user selects a question to be delivered. For example, in a case where a delivery request is made, the processor 11 returns a list of questions created by the first user who made the delivery request, to the terminal 20*a* from which the delivery request was made. The first user selects a question to be delivered, from the list of questions. If the question is selected, the process advances to step S102. Note that, along with the selection of the question to be delivered, the date/time of delivery of the question, the time limit of publicizing of the question, and the like, may be set.

In step S102, the first user sets a destination of delivery of the question. After the question is selected, the processor 11 returns to the terminal 20a, for example, a list of second users for whom the first user is in charge of tests. The first user sets, from the list, a second user that is the destination of delivery. If the destination of delivery is set, the process advances to step S103. The setting of the destination of delivery is not limited to the selection from the list. The destination of delivery may be set, for example, by the first user directly designating a user name or email addresses of each of the second users.

In step S103, the processor 11 registers, in the storage 14, information indicating the selected question and information indicating the destination of delivery of the question.

In step S104, the processor 11 notifies the second user's terminal 20b of the destination of delivery, that the question has been registered. Thereafter, the processor 11 terminates the process of FIG. 5. The notification may be, for example, a notification by email, a notification by a short message, or the like. The notification includes at least a URL of a question. The second user can answer the question by accessing the URL designated from the server 10 by using the terminal 20b. Here, in a case where the date/time of delivery of the question, the time limit of publicizing of the question, and the like, are set, the notification includes the information of the date/time of delivery of the question and the time limit of publicizing. In a case where the date/time of delivery of the question is set, the second user cannot answer the question until the set date/time of delivery. In addition, in a case where the time limit of publicizing is set, the second user cannot answer the question after the time limit of publicizing.

Figure 6:
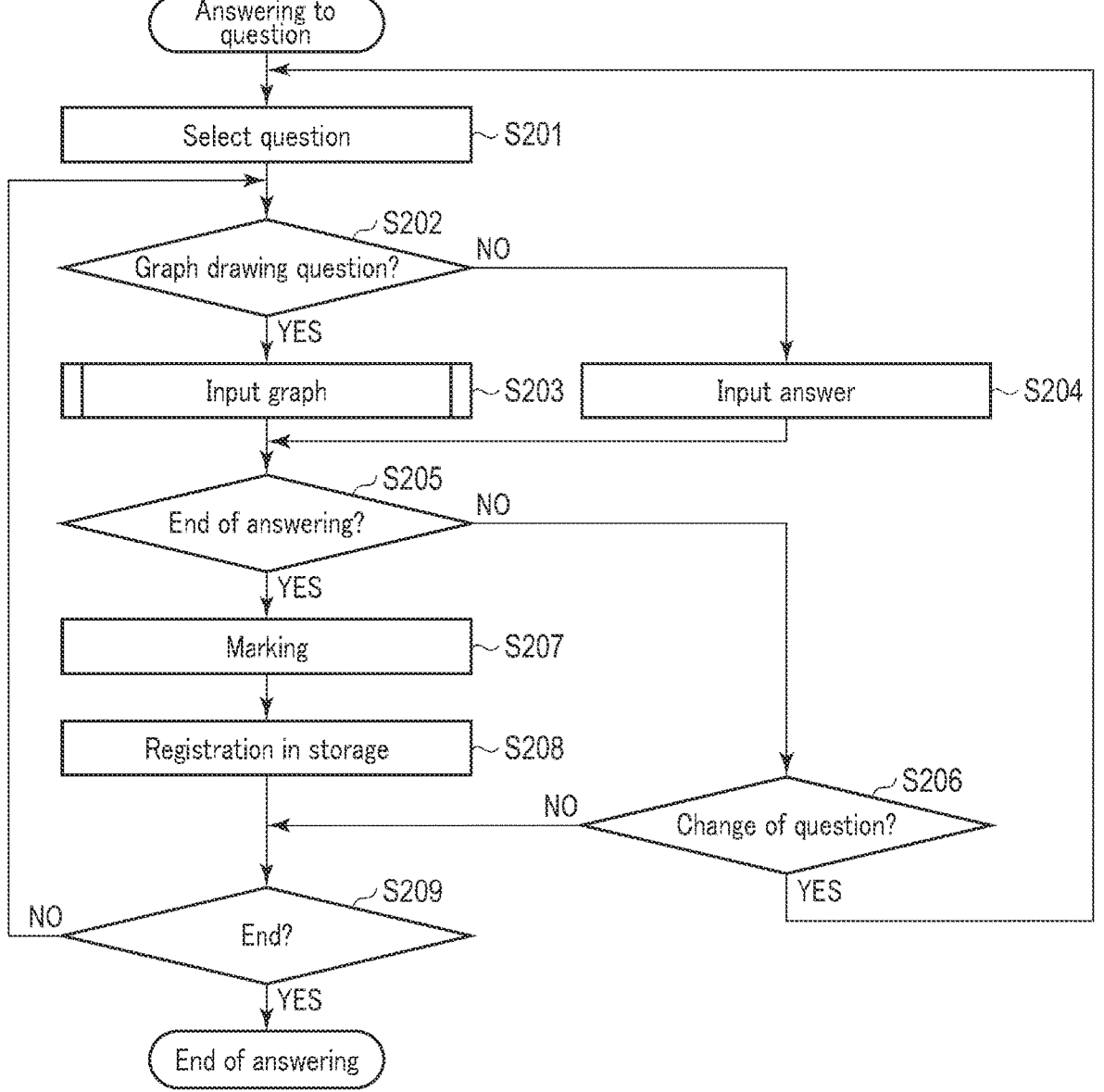
FIG. 6 is a flowchart illustrating an operation of the system at a time of answering a question.

FIG. 6 is a flowchart illustrating an operation of the system 1 at a time of answering a question. A process of FIG. 6 is executed by the cooperation between the CPU 21 of the terminal 20b and the processor 11 of the server 10. The second user, such as a student, in a position of answering a question, accesses the URL designated from the server 10 by using the terminal 20b.

In step S201, the second user selects a question to which the second user himself/herself answers, from among the delivered questions. The processor 11 returns to the terminal 20b the paper 100 including an answer screen of the question selected by the user. For example, in a case where the designated URL is accessed from the terminal 20b, the processor 11 returns a list of questions to the terminal 20b that has made access. The second user selects a question to which the second user himself/herself answers, from the list of questions. The processor 11 returns to the terminal 20b the paper 100 including an answer screen of the selected question. Alternatively, for example, in a case where the designated URL is accessed from the terminal 20b, the processor 11 may return the paper 100 including the answer screen of question 1 that is the first question, to the terminal 20b that has made access. In this case, if a change of the question is requested by the second user thereafter, the processor 11 may return the paper 100 including the answer screen of another question, to the terminal 20b that has made access.

Figure 7:
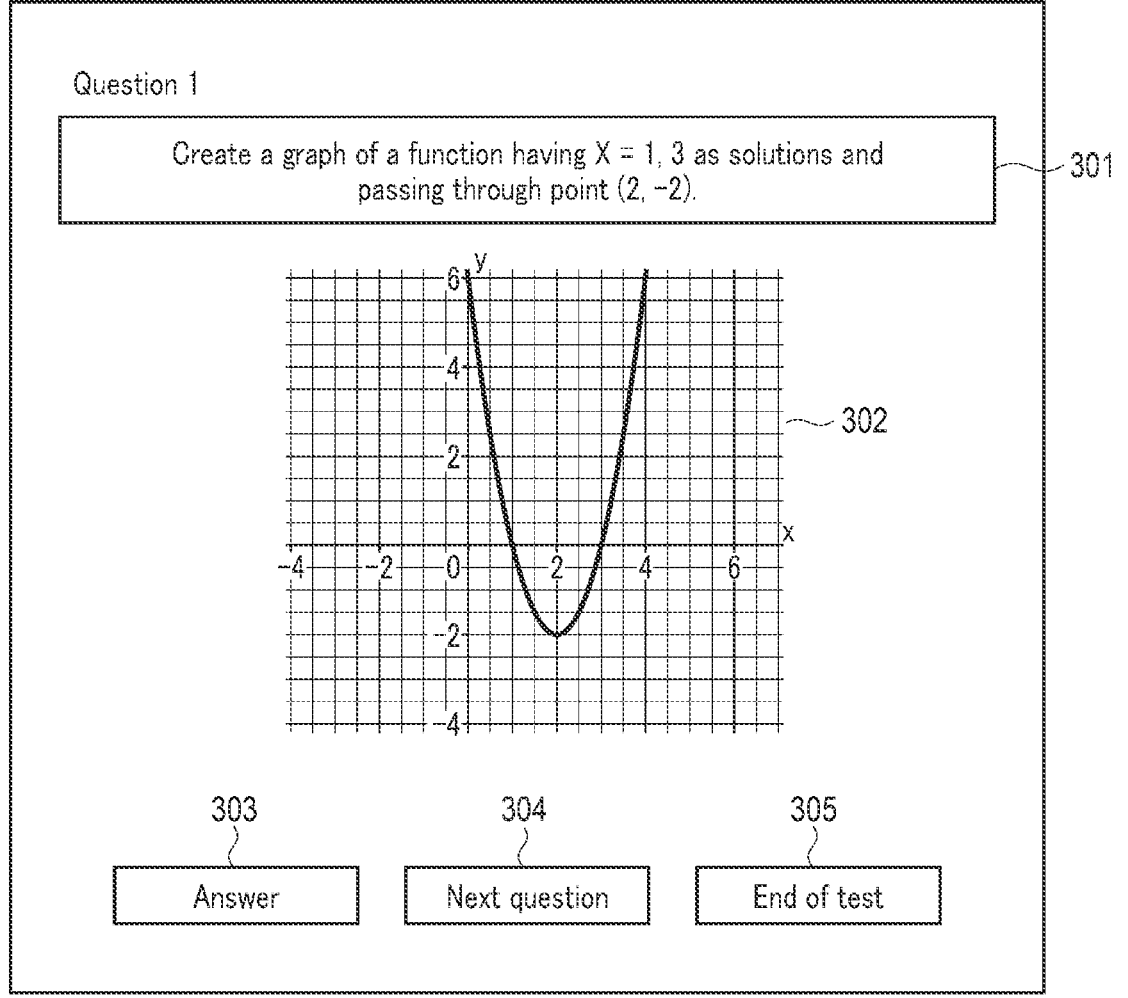
FIG. 7 is a view illustrating an example of an answer screen displayed on a terminal 20b.

FIG. 7 is a view illustrating an example of the answer screen displayed on the terminal 20b. The answer screen is displayed, for example, in the sticky note 101 on the paper 100 for answering. In a case where the paper 100 for answering is created from data of a plurality of questions, one sticky note 101 including the answer screen of one question may be displayed, or a plurality of sticky notes 101 including answer screens of the respective questions may be displayed at the same time, or one sticky note 101 including the answer screens of the respective questions may be displayed.

As illustrated in FIG. 7, the answer screen includes a wording-of-question display field 301, an answer input field 302, an answer button 303, a question change button 304, and a test end button 305. The wording-of-question display field 301 is a display field of a wording of the question created by the first user. The answer input field 302 is an input field for the second user to input an answer to the question. The answer input field 302 in FIG. 7 is an answer input field 302 of a graph drawing question. In this case, at first, only a coordinate plane is displayed in the answer input field 302. The user draws a graph on the coordinate plane by handwriting. The answer button 303 is a button that is selected at a time of presenting an answer to the corresponding question. The question change button 304 is a button that is selected at a time of causing the next question to be displayed, without presenting an answer to the corresponding question. The question change button 304 is not necessary in a case where an answer screen of a plurality of questions is displayed on the paper 100. The test end button 305 is a button that is selected at a time of ending the test.

Here, the description returns to FIG. 6. In step S202, the processor 11 determines whether the question selected by the second user is a graph drawing question or not. In step S202, if it is determined that the question selected by the second user is a graph drawing question, the process advances to step S203. In step S202, if it is not determined that the question selected by the second user is a graph drawing question, the process advances to step S204.

In step S203, the processor 11 executes a graph input process. After the graph input process, the process advances to step S205. The graph input process is a process of accepting an input of a graph by the second user as an answer, and includes a process of giving such assistance that a graph intended by the second user is drawn. The details of the graph input process will be described later.

In step S204, the processor 11 executes an ordinary answer input process. In an ordinary answering process, the second user inputs an answer to a question in the answer input field 302. The ordinary answering process ends if one of the answer button 303, question change button 304 and test end button 305 is selected. After the end of the ordinary answer input process, the process advances to step S205.

In step S205, the processor 11 determines whether or not to end the answering. For example, if the answer button 303 is selected, it is determined that the answering is ended. In step S205, if it is not determined that the answering is ended, the process advances to step S206. In step S205, if it is determined that the answering is ended, the process advances to step S207.

In step S206, the processor 11 determines whether or not to change the question. For example, if the question change button 304 is selected, it is determined that the question is changed. In step S206, if it is determined that the question is changed, the process returns to step S201. In step S206, if it is not determined that the question is changed, the process advances to step S209.

In step S207, the processor 11 executes marking for the answer by the second user. The marking is carried out by comparing the answer by the second user with a model answer. For example, if the answer by the second user agrees with the model answer, the processor 11 sets the value of the allocation of points designated by the first user as a marking result for the question. On the other hand, if the answer by the second user does not agree with the model answer, the processor 11 determines the allocation of points for the first user in accordance with a marking standard designated by the first user. Here, the marking may be carried out by a manual operation by the first user. After the completion of the marking, the process advances to step S208.

In step S208, the processor 11 stores the marking result in the storage 14. Thereafter, the process advances to step S209.

In step S209, the processor 11 determines whether or not to end the test. For example, if the answer button 303 is selected for all questions, if the test end button 305 is selected, or if the time limit of publicizing has passed, it is determined that the test is ended. In step S209, if it is not determined that the test is ended, the process returns to step S202. In step S209, if it is determined that the test is ended, the processor 11 terminates the process of FIG. 6.

Figure 8:
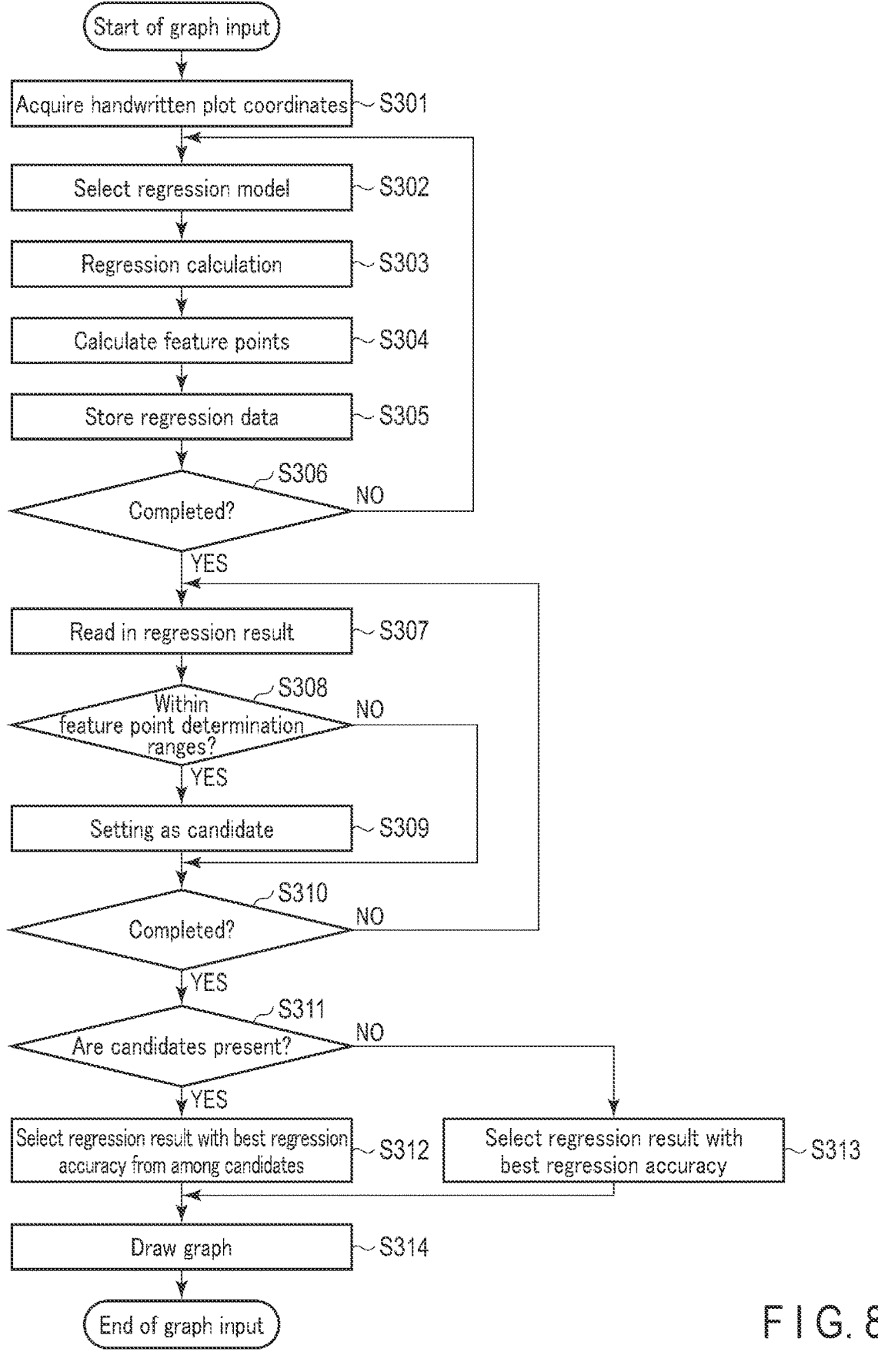
FIG. 8 is a flowchart illustrating a graph input process.

Next, the graph input process is described. FIG. 8 is a flowchart illustrating the graph input process. In step S301, the processor 11 acquires coordinates of plot points by a graph input by handwriting by the second user.

In step S302, the processor 11 selects one of a plurality of regression models for calculating a graph represented by plot points. The regression models may include a plurality of models such as a linear regression model, a quadratic curve regression model, and a logistic regression model. As the regression model, a neural network model or the like may be used. In this manner, the regression model in the embodiment is not particularly limited, but the processor 11 is configured to be capable of executing a regression calculation by at least two regression models.

In step S303, the processor 11 executes a regression calculation. The regression calculation is a process of calculating a regression graph that best represents the acquired points, by applying the selected regression model to each of the acquired points.

In step S304, the processor 11 calculates coordinates of feature points in the regression graph. The feature points are the above-described feature points determined on a graph-expression-by-graph-expression basis.

In step S305, the processor 11 stores graph data of the calculated regression graph and data of the coordinates of the feature points as a regression result, for example, in the RAM 13.

In step S306, the processor 11 determines whether the processing in regard to all regression models is completed. In step S306, if it is not determined that the processing in regard to all regression models is completed, the process returns to step S302. In this case, the process from the selection of the regression model is executed once again. In step S306, if it is determined that the processing in regard to all regression models is completed, the process advances to step S307.

In step S307, the processor 11 reads in one of the regression results stored in the RAM 13.

In step S308, based on the read-in regression result, the processor 11 determines whether the coordinates of the feature points in the regression model are within the determination ranges. In step S308, if it is determined that the coordinates of the feature points are within the determination ranges, the process advances to S309. In step S308, if it is not determined that the coordinates of the feature points are within the determination ranges, the process advances to S310. In particular, in many cases, a graph drawn by handwriting on a computer deviates from a shape intended by the user. On the other hand, in the vicinity of the feature points, it is expected that the user tries to draw the graph with a certain degree of accuracy. Accordingly, it is considered that there is a possibility that a graph with coordinates of feature points being with the determination ranges reflects features of the graph intended by the user. Here, from the standpoint of increasing the possibility that the features of the graph intended by the user are reflected, it is desired that the condition that the coordinates of the feature point are within the determination range be satisfied for all the feature points. On the other hand, if the condition is satisfied, for example, for a majority of the feature points, it may be determined that the coordinates of the feature points are within the determination ranges.

In step S309, the processor 11 sets the read-in regression result as a candidate for the graph intended by the second user. For example, the processor 11 adds to the read-in regression result a label indicating that the read-in regression result is set as the candidate. Thereafter, the process advances to step S310.

In step S310, the processor 11 determines whether the processing in regard to all regression models is completed. In step S310, if it is not determined that the processing in regard to all regression models is completed, the process returns to step S307. In this case, the process from the read-in of the regression result is executed once again. In step S310, if it is determined that the processing in regard to all regression models is completed, the process advances to step S311.

In step S311, the processor 11 determines whether there are candidate regression results. In step S311, if it is determined that there are candidate regression results, the process advances to step S312. In step S311, if it is not determined that there are candidate regression results, the process advances to step S313.

In step S312, the processor 11 selects one regression result with the best regression accuracy, from among the candidate regression results. Thereafter, the process advances to step S314. The regression accuracy can be calculated, for example, by a mean square error (MSE). In a case where the regression accuracy is calculated by the MSE, a regression result with a minimum MSE is the best regression result. A regression graph with a good regression accuracy is closest to the handwritten graph of the second user. In other words, the regression graph selected in step S312 reflects the features of the graph intended by the user, and is closest to the actually created graph of the user.

In step S313, the processor 11 selects one regression result with the best regression accuracy from among all regression results. Then, the process advances to step S314. In other words, it cannot necessarily be said that the regression graph selected in step S313 reflects the features of the graph intended by the user, but this regression graph is closest to the actually created graph of the user.

In step S314, the processor 11 draws a regression graph, which is based on the selected regression result, in the answer input field 302, instead of the handwritten graph of the second user. Thereafter, the processor 11 terminates the process of FIG. 8.

As has been described above, according to the embodiment, a plurality of regression graphs are calculated by applying a plurality of regression models to coordinates of plot points that are input by handwriting by the user. In addition, in a case where feature points that are data elements of each regression graph are within the determination ranges that are preset on a graph-by-graph basis, the regression graph is set as a candidate for a graph intended by the user. Among such candidate regression graphs, a regression graph with the best regression accuracy is selected as the graph intended by the user. Then, the selected regression graph is displayed in place of the graph handwritten by the user. In this manner, in the present embodiment, a regression graph that is simply close to a graph drawn by the user is not selected, but a regression graph is selected by taking the features of the graph itself into account. Accordingly, a graph intended by the user who has drawn a graph by handwriting can correctly be drawn on the computer. Besides, in the embodiment, the determination range is set, not by the second user who actually draws the graph by handwriting, but by the first user who evaluates the drawn graph. In this case, a regression graph, in which the plot points handwritten by the second user are included in the determination ranges intended by the first user, is selected. In other words, in a case where the intention of the first user agrees with the intention of the second user, a graph of a model answer is drawn. Accordingly, in a case where the first user marks a test, the first user can easily judge whether the second user correctly draws the graph.

Furthermore, depending on a graph drawn by the user, the feature points of the graph do not necessarily fall within the determination ranges intended by the user. Even in such a case, a regression graph that is simply close to the graph drawn by the user is selected. Thereby, a graph intended by the user, who has drawn a graph by handwriting, can correctly be drawn on the computer to some degree.

MODIFICATIONS

Hereinafter, modifications of the embodiment are described. In the above-described step S314, if the selection of the regression graph is completed, the regression graph is immediately drawn in place of the graph drawn by the user. On the other hand, for example, before drawing the regression graph, the processor 11 may present the regression graph to the second user, thereby prompting confirmation by the second user. As a result of confirmation, only in a case where the update of the graph is instructed by the second user, the processor 11 may draw the regression graph in place of the graph drawn by the second user.

Additionally, in the embodiment, among the regression graphs in which the feature points are within the determination ranges, the regression graph with the best regression accuracy is selected. Conversely, among upper-class regression graphs with a good regression accuracy, a regression graph closest to a reference point in the determination range may be selected.

Additionally, in the embodiment, the example, which relates to the graph drawing by handwriting at the time of answering a test question, is illustrated. On the other hand, the technology of the embodiment is also applicable to the graph drawing by handwriting in cases other than answering the test question. Here, in an example of answering a test question, the determination ranges are designated based on a model answer designated by the first user at the time of creating the question. The determination ranges in regard to the graph drawing by handwriting in cases other than answering the test question may be designated by the second user. For example, as regards the determination ranges, the determination ranges relating to a function, in connection with which drawing is assumed, may be presented to the second user, and the determination ranges may be set by prompting the second user to correct the presented determination ranges.

Additionally, in the embodiment, the regression graph, in which the feature points of the graph input by handwriting by the second user are within the determination ranges, and which is close to the graph input by handwriting, is drawn as a corrected graph of the graph input by handwriting. On the other hand, the graph input by handwriting by the second user may be left as such, and the regression graph may be taken into account at the time of automatic marking. Specifically, such a process may be executed that, at the time of automatic marking, feature points similar to those of the graph input are calculated, and in a case where the feature points are within the determination ranges designated in advance by the first user and the regression graph substantially agrees with the graph of the model answer, the graph input by handwriting by the second user is deemed to be correct.

The present invention is not limited to the above-described embodiments. In practice, various modifications may be made without departing from the spirit of the invention. In addition, the embodiments may be implemented by being appropriately combined as much as possible, and, in this case, advantageous effects of the combined embodiments can be obtained. Furthermore, the embodiments include various inventions at various stages, and various inventions can be derived from appropriate combinations of the structural elements disclosed herein. For example, even if some structural elements are omitted from all the structural elements disclosed in the embodiments, if the problem described in the section of the Technical Problem can be solved and the advantageous effects described in the section of the Advantageous Effects of the Invention can be obtained, the structure, in which the structural elements are omitted, can be derived as an invention.

What is claimed is:

1. A computer-readable non-transitory storage medium storing a graph drawing program for causing a computer to execute:

acquiring a plot point of a first graph by a handwriting input;

regressively calculating a plurality of graph data by a plurality of regression models, based the acquired plot point;

performing first determination to determine, in regard to each of the graph data, whether at least a partial data element is included in a predetermined range of coordinates;

performing second determination to determine graph data having a good regression accuracy among the plurality of graph data;

selecting one of the graph data, based on a result of the first determination and a result of the second determination; and drawing a second graph in place of the first graph, based on the selected graph data.

2. The storage medium of claim 1, wherein the selecting one of the graph data includes selecting graph data, with respect to which the first determination determines that the at least the partial data element is included in the predetermined range of coordinates, and which is determined in the second determination to have the good regression accuracy.

3. The storage medium of claim 1, wherein the selecting one of the graph data includes selecting graph data that is determined to have a best regression accuracy in the second determination performed for all of the graph data, in a case where there is no graph data with respect to which the first determination determines that the at least the partial data element is included in the predetermined range of coordinates.

4. The storage medium of claim 1, wherein the range of coordinates is set based on a graph expression that is input in advance.

5. The storage medium of claim 4, wherein the range of coordinates is set by using, as a reference point, a feature point in a graph represented by the graph expression.

6. The storage medium of claim 5, wherein the feature point includes at least one of an intersection with an abscissa axis in the graph represented by the graph expression, an extreme point, and an infinite point.

7. The storage medium of claim 1, wherein the range of coordinates is manually set based on a graph represented by a graph expression that is input in advance.

8. A server comprising a processor including hardware configured to:

acquire a plot point of a first graph by a handwriting input;

regressively calculate a plurality of graph data by a plurality of regression models, based the acquired plot point;

perform first determination to determine, in regard to each of the graph data, whether at least a partial data element is included in a predetermined range of coordinates;

perform second determination to determine graph data having a good regression accuracy among the plurality of graph data;

select one of the graph data, based on a result of the first determination and a result of the second determination; and draw a second graph in place of the first graph, based on the selected graph data.

* * * * *